C. C. SCHWANER.
CLOTHES-LINE PROP.
No. 170,775. Patented Dec. 7, 1875.
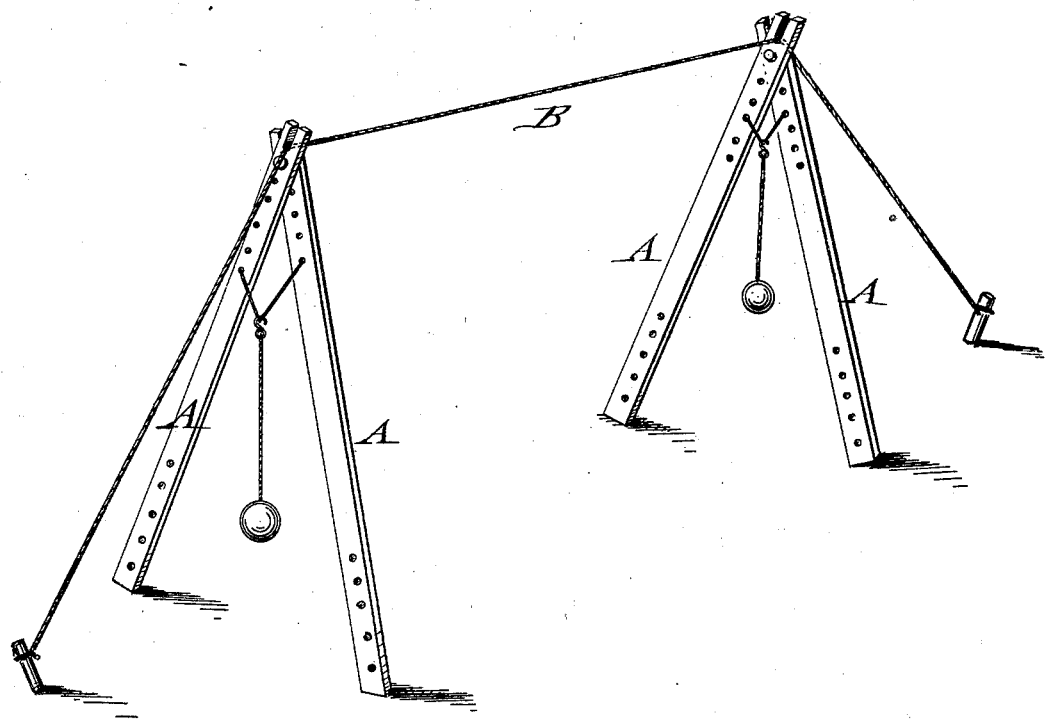

UNITED STATES PATENT OFFICE.

CHRISTIAN C. SCHWANER, OF WINTERSET, IOWA.

IMPROVEMENT IN CLOTHES-LINE PROPS.

Specification forming part of Letters Patent No. 170,775, dated December 7, 1875; application filed July 24, 1875.

*To all whom it may concern:*

Be it known that I, CHRISTIAN C. SCHWANER, of Winterset, in the county of Madison and State of Iowa, have invented a new and Improved Clothes-Prop, of which the following is a specification:

In the accompanying drawing, Figure 1 represents a perspective view.

Similar letters of reference indicate corresponding parts.

The invention will first be described in connection with the drawing, and then pointed out in the claim.

In the drawing, A represents the pieces of wood, of suitable length, which are provided at both ends with a number of perforations, for the purpose of being connected by suitable cross-pins. Four of these pieces are employed, which form, when two of them are connected by a pivot-pin at the upper end, and spread apart at the lower end, two props for clothes-lines, as indicated in Fig. 1. The upper ends of the prop-pieces are slotted for the purpose of forming a groove, open slot, or socket for securely retaining the clothes-line B therein, which is stretched across the props in any suitable manner. The props have to be connected by a cord and weighted in suitable manner to resist more effectually the wind, and prevent the blowing away or tumbling over of clothes and props.

I am aware that it is not new to pivot pairs of props at upper beveled ends, so that they may clamp the line when in one particular position; but my object is to clamp the line in such a way that the legs of props may be spread to bring the line down to a convenient altitude for fastening the clothes thereon, and then have them brought toward each other, in order to raise the line with the fastened clothes, the line being all the time clamped by the grooved ends lapping each other. Hence,

What I claim as new and of my invention is—

The combination, with a line, B, of four props, A, open-slotted at their upper ends, and pivoted under said slots in opposite pairs, as and for the purpose specified.

CHRISTIAN C. SCHWANER.

Witnesses:
R. E. COOPER,
F. M. BURGOYNE.